United States Patent
Ogasahara (10) Patent No.: US 8,836,748 B2
(45) Date of Patent: Sep. 16, 2014

(54) OPTICAL UNIT, LIGHT SCANNING DEVICE, AND IMAGE FORMING APPARATUS

(71) Applicant: KYOCERA Document Solutions Inc., Osaka (JP)

(72) Inventor: Okito Ogasahara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/777,293

(22) Filed: Feb. 26, 2013

(65) Prior Publication Data
US 2013/0222508 A1 Aug. 29, 2013

(30) Foreign Application Priority Data
Feb. 27, 2012 (JP) .................... 2012-039571

(51) Int. Cl.
| | |
|---|---|
| B41J 2/435 | (2006.01) |
| B41J 15/14 | (2006.01) |
| B41J 27/00 | (2006.01) |
| G03G 15/04 | (2006.01) |
| G02B 26/12 | (2006.01) |
| G06K 7/10 | (2006.01) |

(52) U.S. Cl.
CPC .............. *G03G 15/04* (2013.01); *G02B 26/122* (2013.01); *G02B 26/121* (2013.01); *G06K 7/10613* (2013.01)
USPC ............................ 347/261; 347/231; 347/243

(58) Field of Classification Search
USPC ......... 347/229, 231, 234, 235, 243, 248–250, 347/259–261
See application file for complete search history.

(56) References Cited

U.S. PATENT DOCUMENTS
| | | |
|---|---|---|
| 2003/0202221 A1 | 10/2003 | Motoi et al. |
| 2008/0166150 A1 | 7/2008 | Osada |
| 2010/0245521 A1 | 9/2010 | Kubo |

FOREIGN PATENT DOCUMENTS
| | | | | |
|---|---|---|---|---|
| JP | 2000-241747 | | 9/2000 | |
| JP | 2005-96086 | | 4/2005 | |
| JP | 2011197200 A | * | 10/2011 | ............. G02B 26/12 |

\* cited by examiner

*Primary Examiner* — Hai C Pham
(74) *Attorney, Agent, or Firm* — Gerald E. Hespos; Michael J. Porco; Matthew T. Hespos (57) ABSTRACT

A light scanning device includes an optical unit. The optical unit includes a polygon mirror and a polygon motor. The polygon mirror includes n (n is an integer equal to or larger than 1) mirror surfaces and guides light in a main scanning direction of an image bearing member. The polygon motor includes m (m is an integer equal to or larger than 1 and is coprime with n) poles and rotates the polygon mirror.

6 Claims, 6 Drawing Sheets

| CLOCK GENERATION NUMBER | MIRROR SURFACE NUMBER | |
|---|---|---|
| 1 | 1 | ←REFERENCE CLOCK GENERATION NUMBER |
| 13 | 2 | |
| 10 | 3 | |
| 7 | 4 | |
| 4 | 5 | |

OPTICAL UNIT, LIGHT SCANNING DEVICE, AND IMAGE FORMING APPARATUS

This application is based upon and claims the benefit of priority from Japanese Patent Application No. 2012-39571 filed in Japan Patent Office on Feb. 27, 2012, the entire contents of which are incorporated herein by reference.

BACKGROUND

The present disclosure relates to an optical unit that forms an electrostatic image by scanning, in a main scanning direction of an image bearing member, light emitted from a light source, and to a light scanning device and an image forming apparatus in which the optical unit is used.

A light scanning device used in an image forming apparatus of an electrophotographic system includes a light source and a polygon mirror. A laser beam emitted from the light source is reflected by a polygon mirror driven to rotate. The laser beam scans the circumferential surface of a photosensitive drum in a main scanning direction, whereby an electrostatic latent image is formed on the photosensitive drum.

On mirror surfaces of the polygon mirror, fluctuation in flatness is sometimes caused by a bulge due to a molding condition, a centrifugal force of rotation, or the like. If the flatness is different depending on the mirror surfaces, the magnification in the main scanning direction of a laser spot condensed on the circumferential surface of the photosensitive drum is different for each of the mirror surfaces. As a result, an irradiation position of a dot shifts in every scanning. A jitter appears in an image at a cycle of one revolution of the polygon mirror. In particular, in a halftone image on a screen or the like, dots markedly interfere with one another and a jitter tends to occur, causing deterioration in image quality.

Conventionally, there is known a method of detecting one revolution of the polygon mirror with a reflection optical sensor and the like and correcting emission timing and magnification of a laser beam when the mirror surfaces are used. However, in this method, since the dedicated reflection optical sensor is used to specify the mirror surfaces, an increase in costs due to the addition of the sensor is inevitable.

It is an object of the present disclosure to provide an optical unit that can easily specify mirror surfaces of a polygon mirror without using a dedicated sensor and a light scanning device and an image forming apparatus in which the optical unit is used.

SUMMARY

A light scanning device according to an aspect of the present disclosure includes a light source which emits a laser beam, an optical unit, a signal output section which outputs a clock signal, a light receiving section, a clock-generation-number storing section, and a specifying section. The optical unit includes a polygon mirror including n (n is an integer equal to or larger than 1) mirror surfaces and which guides the laser beam in a main scanning direction of an image bearing member and a polygon motor including m (m is an integer equal to or larger than 1 and is coprime with n) poles and which rotates the polygon mirror. The light receiving section is arranged on a start end side in the main scanning direction on a scanning path of the laser beam reflected by the polygon mirror. The light receiving section receives the laser beam and outputs a light reception signal. The clock-generation-number storing section assigns serial numbers to periods obtained by dividing, by a number 3m/2, one cycle of the light reception signal periodically obtained by supplying the clock signal to the polygon motor to rotate the polygon mirror and stores, as a serial number corresponding to specific one surface among the n mirror surfaces, the serial number of at least one period among the divided periods synchronizing with edge timings of one of rising edges and falling edges of the clock signals in number required for rotating the polygon mirror once. The specifying section treats, as periods corresponding to the at least one period, periods equivalent to three consecutive serial numbers including the serial number of the at least one period and the serial numbers before and after the serial number, to specify, as a period in which the specific one surface among the mirror surfaces is used, a cycle of the light reception signal at the time when the edge timings are detected in the periods.

An image forming apparatus according to another aspect of the present disclosure includes an image bearing member, the light scanning device which irradiates a laser beam based on image data on the image bearing member to form an electrostatic latent image, and an image forming section which supplies a developer to the image bearing member to visualize the electrostatic latent image to thereby form an image.

An optical unit according to still another aspect of the present disclosure includes a polygon mirror and a polygon motor. The polygon mirror includes n (n is an integer equal to or larger than 1) mirror surfaces and guides light in a main scanning direction of an image bearing member. The polygon motor includes m (m is an integer equal to or larger than 1 and is coprime with n) poles and rotates the polygon mirror.

DETAILED DESCRIPTION

Figure 1:
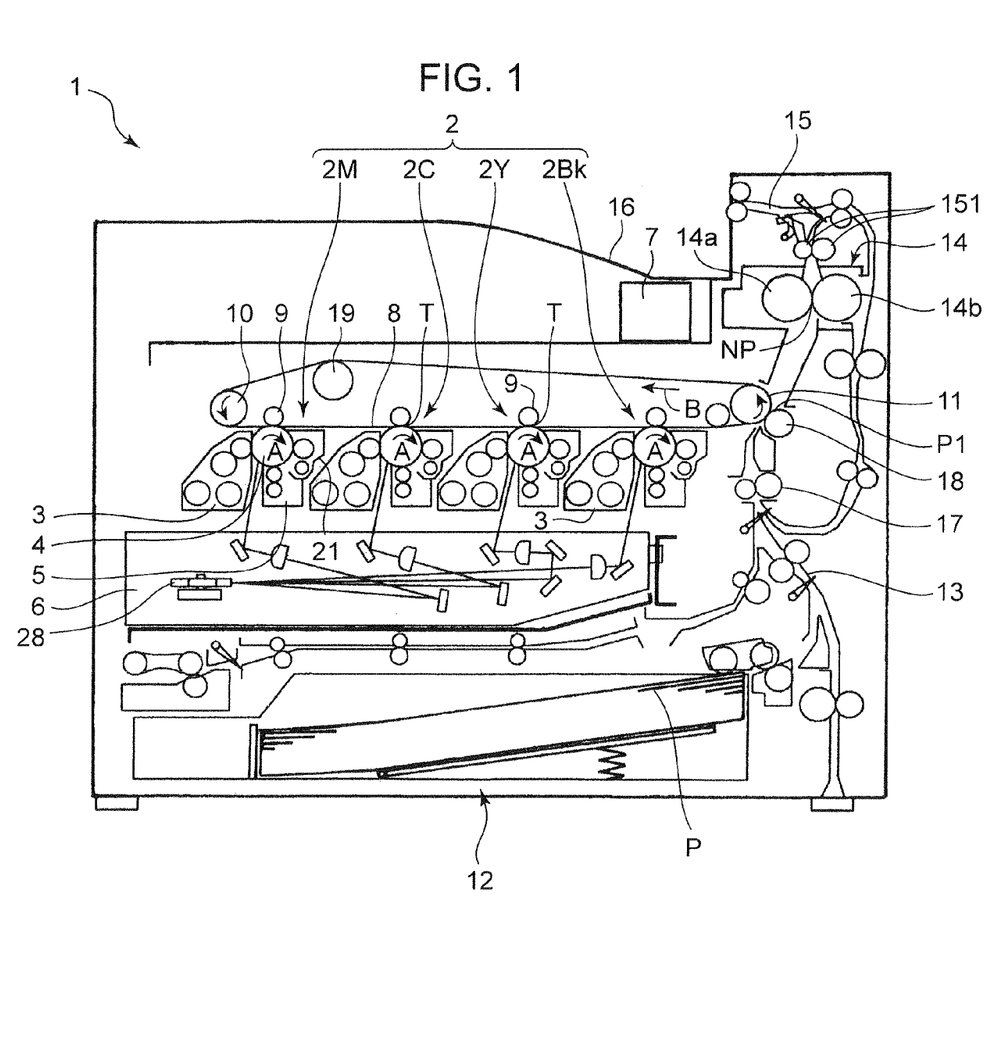
FIG. 1 is a schematic diagram of an internal configuration of an image forming apparatus including a light scanning device according to the present disclosure.

An embodiment for carrying out the present disclosure is explained below with reference to the drawings. FIG. 1 is a diagram schematically showing an internal configuration of an image forming apparatus including a light scanning device according to an embodiment of the present disclosure. In this embodiment, a printer is explained as an example of the image forming apparatus. However, besides the printer, the image forming apparatus only has to be an image forming apparatus employing an electrophotographic system such as a copying machine, a facsimile machine, and a multifunction peripheral including functions of the copying machine and the facsimile machine. The image forming apparatus explained in this embodiment is a color printer. However, the image forming apparatus may be a monochrome printer.

An image forming apparatus 1 is a tandem-type color printer including image forming sections 2 (2M, 2C, 2Y, and 2Bk) for respective colors of magenta (M), cyan (C), yellow (Y), and black (Bk). Each of the image forming sections 2M, 2C, 2Y, and 2Bk includes developing devices 3, photosensitive drums 4 (image bearing members), charging devices 5, exposing devices 6 (light scanning devices), toner supplying sections 7, cleaners 21, and primary transfer rollers 9.

The photosensitive drums 4 are located below a transfer belt 8 explained below and are displaced in a state in which the photosensitive drums 4 are in contact with the outer surface of the transfer belt 8. The photosensitive drum 4 for magenta is arranged on the most upstream side in a rotating direction B of the transfer belt 8. The photosensitive drum for cyan, the photosensitive drum for yellow, and the photosensitive drum for black are provided in parallel, following the magenta section. The photosensitive drums 4 are formed of a-Si (amorphous silicon) or the like. The photosensitive drums 4 rotate in a clockwise direction in FIG. 1 (an A direction shown in the figure).

In positions opposed to the photosensitive drums 4, the primary transfer rollers 9 are arranged via the transfer belt 8 in a state in which the primary transfer rollers 9 are in contact with the inner surface of the transfer belt 8. The primary transfer rollers 9 are rollers driven to rotate according to the rotation of the transfer belt 8. The primary transfer rollers 9 and the photosensitive drums 4 nip the transfer belt 8 to form primary transfer sections T for primarily transferring toner images of the colors formed on the photosensitive drums 4 onto the transfer belt 8. In the primary transfer sections T, the toner images of the colors are multiply transferred onto the transfer belt 8. Consequently, a color toner image is formed on the transfer belt 8.

The charging devices 5 uniformly charge the circumferential surfaces of the photosensitive drums 4. The exposing devices 6 irradiate laser beams on the uniformly-charged circumferential surfaces of the photosensitive drums 4 to form electrostatic latent images. The exposing device 6 includes a polygon mirror 28 that guides the laser beams, which are modulated on the basis of image data transmitted from an external apparatus, to the circumferential surfaces of the photosensitive drums 4. The polygon mirror 28 scans the laser beams in the main scanning direction on the circumferential surfaces of the photosensitive drums 4 and forms electrostatic latent images on the circumferential surfaces while being rotated by a polygon motor 32 explained below. The main scanning direction is a direction in which the laser beams are scanned along the longitudinal direction (the rotation axis direction) of the photosensitive drums 4. The polygon mirror 28 is shared among the plurality of photosensitive drums 4.

The developing devices 3 supply toners to the photosensitive drums 4. Consequently, the toners are attached to the electrostatic latent images and toner images are formed on the photosensitive drums 4. A toner supplying section 7 stores toners of the colors of magenta, cyan, yellow, and black and supplies the toners of the colors to the developing devices 3. Cleaners 21 are arranged on the circumferential surfaces of the photosensitive drums 4. The cleaners 21 remove residual toners and the like on the circumferential surfaces.

The transfer belt 8 is arranged above the row of the photosensitive drums 4. The transfer belt 8 is tensed between a driven roller 10 and a driving roller 11 to set the outer surface of the transfer belt 8 in contact with each of the circumferential surface of the photosensitive drums 4. The transfer belt 8 is urged upward by a tension roller 19. The driving roller 11 rotates with a driving force generated by a not-shown driving source and drives to rotate the transfer belt 8. The driven roller 10 is driven to rotate according to the rotation of the transfer belt 8. Consequently, the transfer belt 8 rotates in a B direction (a counterclockwise direction).

A region of the transfer belt 8 wound around the driving roller 11 is bent. The bent region is set as a secondary transfer position P1 where toner images primarily transferred onto the transfer belt 8 are secondarily transferred onto a sheet P. In the secondary transfer position P1, a secondary transfer roller 18 opposed to the driving roller 11 via the transfer belt 8 is provided. A nip is formed between the secondary transfer roller and the driving roller 11. The secondary transfer roller 18 secondarily transfers the toner images on the outer surface of the transfer belt 8 onto the sheet P that passes the nip.

A pair of registration rollers 17 is disposed below the secondary transfer position P1. The registration rollers 17 convey the sheet P to the secondary transfer position P1 at appropriate timing and correct skew feeding of the sheet P.

A fixing device 14 that applies fixing treatment to the sheet P, onto which the toner images are secondarily transferred in the secondary transfer position P1, is provided above the secondary transfer position P1. The fixing device 14 includes a heating roller 14a and a pressurizing roller 14b. The pair of rollers forms a fixing nip section NP. When the sheet P passes the fixing nip section NP, while the heating roller 14a heats the sheet P, the pressurizing roller 14b presses the sheet P, whereby the secondarily-transferred toner images are fixed on the sheet P.

A sheet feeding cassette 12 that stores a sheet bundle is arranged in a position below the exposing device 6. A sheet conveying path 13 that guides the sheet P from the sheet feeding cassette 12 to the secondary transfer position P1 is provided between the sheet feeding cassette 12 and the secondary transfer position P1. The registration rollers 17 are disposed in the sheet conveying path 13. Besides the registration rollers 17, a plurality of roller pairs for guiding the sheet P are disposed in appropriate places in the sheet conveying path 13.

After the sheet P passes the fixing nip section NP, the heating roller 14a and the pressurizing roller 14b convey the sheet P to an ejecting roller pair 151. An ejecting section 16 to which the sheet P subjected to the fixing treatment by the fixing device 14 is ejected is formed on the upper surface of the image forming apparatus 1. A sheet ejecting path 15 for guiding the sheet P is provided between the ejecting section 16 and the fixing device 14. The sheet P is conveyed to the sheet ejecting path 15 by the driving of the ejecting roller pair 151 and ejected to the ejecting section 16.

Figure 2:
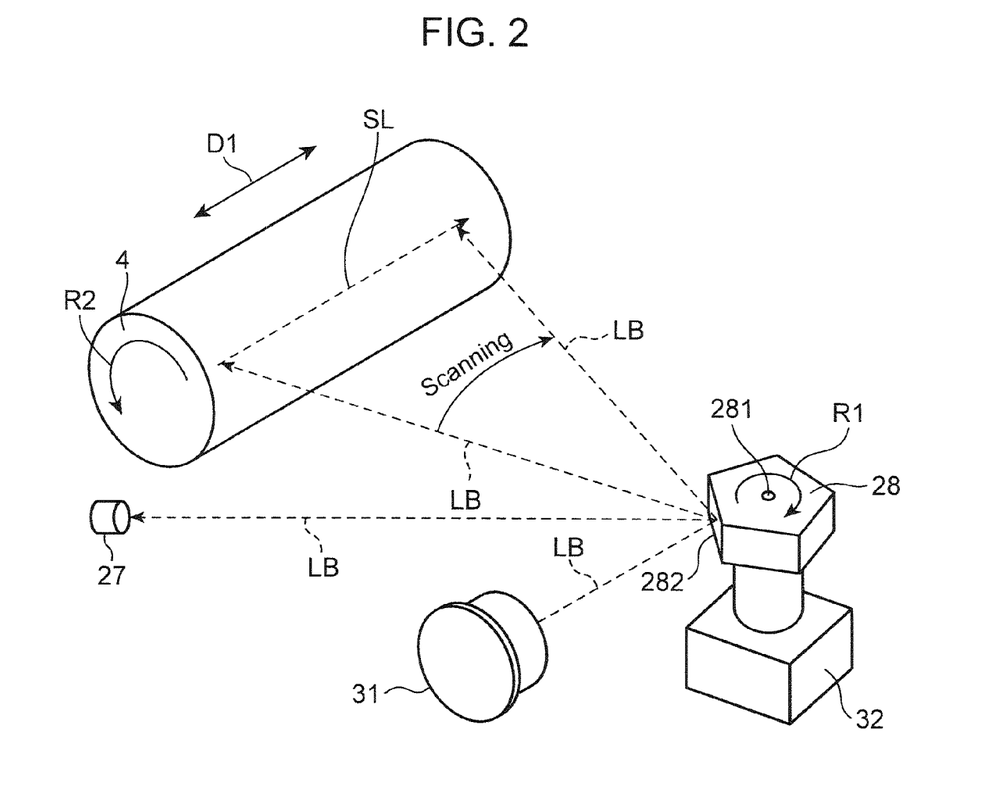
FIG. 2 is a schematic diagram showing a state in which a laser beam is irradiated on a mirror surface of a polygon mirror.
Figure 3:
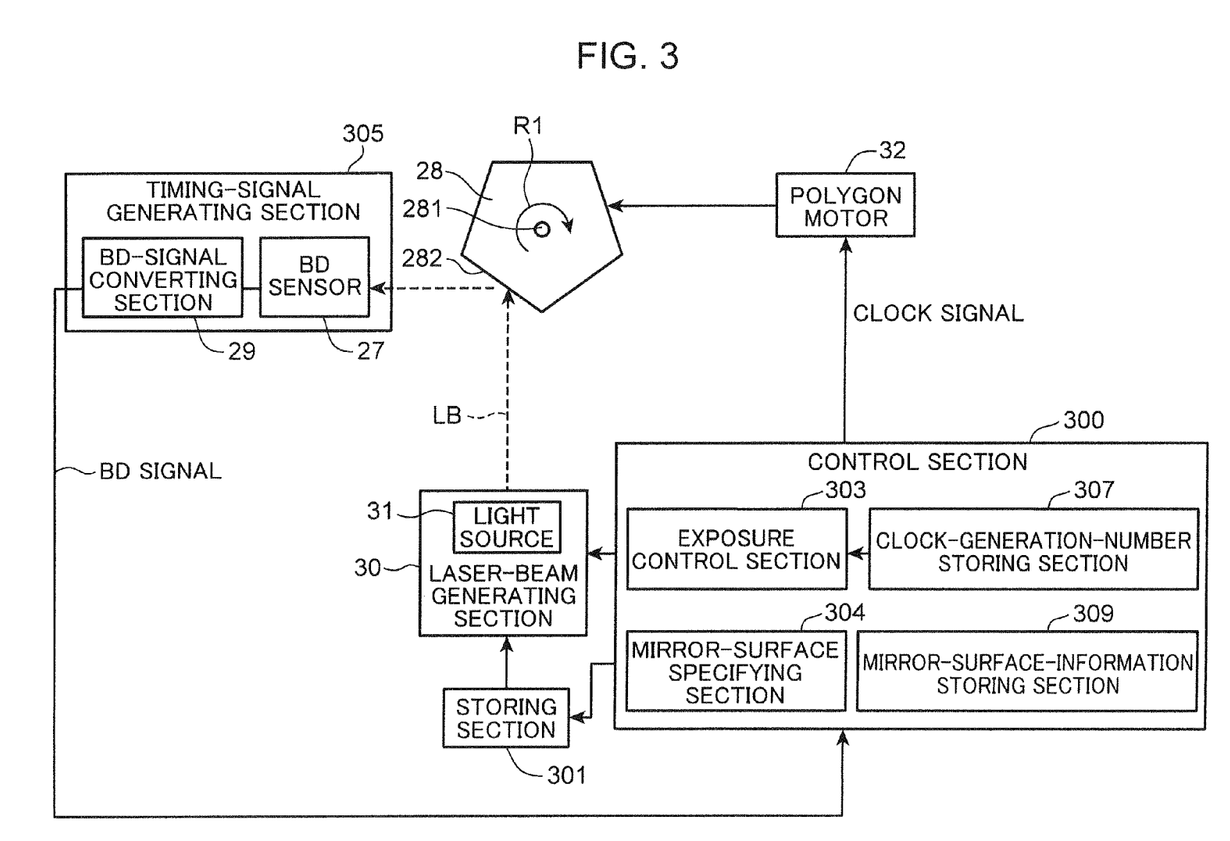
FIG. 3 is a block diagram showing an irradiation control system for a laser beam.

FIG. 2 is a diagram schematically showing a state in which a laser beam LB is irradiated on a mirror surface 282 of the polygon mirror 28. FIG. 3 is a block diagram showing an irradiation control system for the laser beam LB. In FIGS. 2 and 3, optical components such as a collimator lens and an fθ lens are not shown.

A laser-beam generating section 30 includes a light source 31 which emits the laser beam LB and a driving circuit which drives the light source 31. As the light source 31, for example, a semiconductor laser is used.

The polygon mirror 28 (a part of an optical unit) reflects the laser beam LB generated by the laser-beam generating section 30 and guides the laser beam LB to the circumferential surface of the photosensitive drum 4. The polygon mirror 28 rotates in a direction of an arrow R1 around a rotating shaft 281 according to the driving of the polygon motor 32. The polygon mirror 28 includes n (n is an integer equal to or larger than 1) mirror surfaces 282 that reflect the laser beam LB. In this embodiment, the polygon mirror 28 includes five mirror surfaces 282.

A polygon motor 32 (a part of the optical unit) is a motor including m (m is an integer equal to or larger than 1) poles. The number m and the number of surfaces n of the mirror surfaces 282 are coprime. The polygon motor 32 rotates the polygon mirror 28 in the arrow R1 direction on the basis of a clock signal generated by an exposure control section 303 explained below.

The control section 300 manages the control of the entire image forming apparatus 1. The control unit 300 is configured by a microcomputer including a central processing unit (CPU), a read only memory (ROM) having stored therein in advance various computer programs and data and the like necessary for execution of the computer programs, a random access memory (RAM) functioning as a working memory, and a peripheral circuit and the like thereof. The control section 300 functionally includes an exposure control section 303 (a signal output section), a mirror-surface specifying section 304 (a specifying section), and a clock-generation-number storing section 307 and a mirror-surface-information storing section 309. The clock-generation-number storing section 307 and the mirror-surface-information storing section 309 are explained in detail below.

The mirror-surface specifying section 304 specifies, using generation timings of a clock signal for driving the polygon motor 32 generated by the exposure control section 303 and a BD signal generated by the timing-signal generating section 305, a number (a mirror surface number) of a mirror surface on which the laser beam LB is reflected among the mirror surfaces 282 of the polygon mirror 28. Since the mirror-surface specifying section 304 specifies a mirror surface without using a dedicated sensor or the like, it is possible to prevent an increase in costs.

The exposure control section 303 generates a clock signal for driving the polygon motor 32 (a function of a signal output section). For formation of an electrostatic latent image, the exposure control section 303 controls emission timing of the laser beam LB. Specifically, the exposure control section 303 corrects emission timing and magnification in the main scanning direction of the laser beam LB on the basis of information concerning the mirror surface and causes the laser-beam generating section 30 to emit the laser beam LB. In this embodiment, the exposure control section 303 performs, on the basis of the mirror surface number specified by the mirror-surface specifying section 304 and surface information on the mirror surfaces 282 stored by the mirror-surface-information storing section 309, control for causing the laser-beam generating section 30 to irradiate the laser beam LB and render an electrostatic latent image on the photosensitive drum 4. The exposure control section 303 sends, while rotating the polygon mirror 28 with the polygon motor 32 according to the clock signal, image data stored in a storing section 301 to the laser-beam generating section 30 and causes the laser-beam generating section 30 to emit the laser beam LB.

The laser beam LB emitted from the light source 31 is irradiated on the rotating polygon mirror 28 and deflected on the mirror surface 282 to render a scanning line SL on the photosensitive drum 4 in a main scanning direction D1. One scanning line SL is rendered on one mirror surface 282. The rendering of the one scanning line SL is repeated on the rotating photosensitive drum 4 in this way, whereby an electrostatic latent image is formed along the sub-scanning direction. The sub-scanning direction corresponds to a rotating direction R2 of the photosensitive drum 4.

As shown in FIG. 3, the timing-signal generating section 305 includes a beam detect (BD) sensor 27 (a light receiving section) and a BD-signal converting section 29. The laser beam LB is repeatedly scanned in the main scanning direction D1 within a scanning range longer than the dimension in the main scanning direction D1 of the photosensitive drum 4. In the scanning range, the BD sensor 27 is set in a position where the BD sensor 27 receives the laser beam LB before the laser beam LB starts the scanning of the photosensitive drum 4 (a position on a start end side of the main scanning direction on a scanning path of the laser beam).

The BD sensor 27 is a photo sensor. When the BD sensor 27 receives the laser beam LB reflected on the mirror surface 282, the BD sensor 27 outputs a light reception signal of the laser beam LB to the BD-signal converting section 29. The BD-signal converting section 29 shapes the light reception signal into a BD signal of a rectangular wave and outputs the BD signal to the control section 300 (the exposure control section 303).

The BD signal is a signal set as a reference for aligning a write start position in the main scanning direction D1 in rendering an electrostatic latent image on the photosensitive drum 4. The exposure control section 303 causes the light source 31 to emit the laser beam LB with reference to the BD signal.

A method of specifying a mirror surface is explained in detail. First, before factory shipment of the image forming apparatus 1, a period is measured in which the clock signal is generated among periods obtained by dividing, by a number 3m/2, one cycle of the BD signal periodically obtained by supplying the clock signal to the polygon motor 32 and rotating the polygon mirror 28, i.e., a period from the generation of one BD signal to the generation of the next BD signal. A result of the measurement is stored in the clock-generation-number storing section 307.

Figure 4:
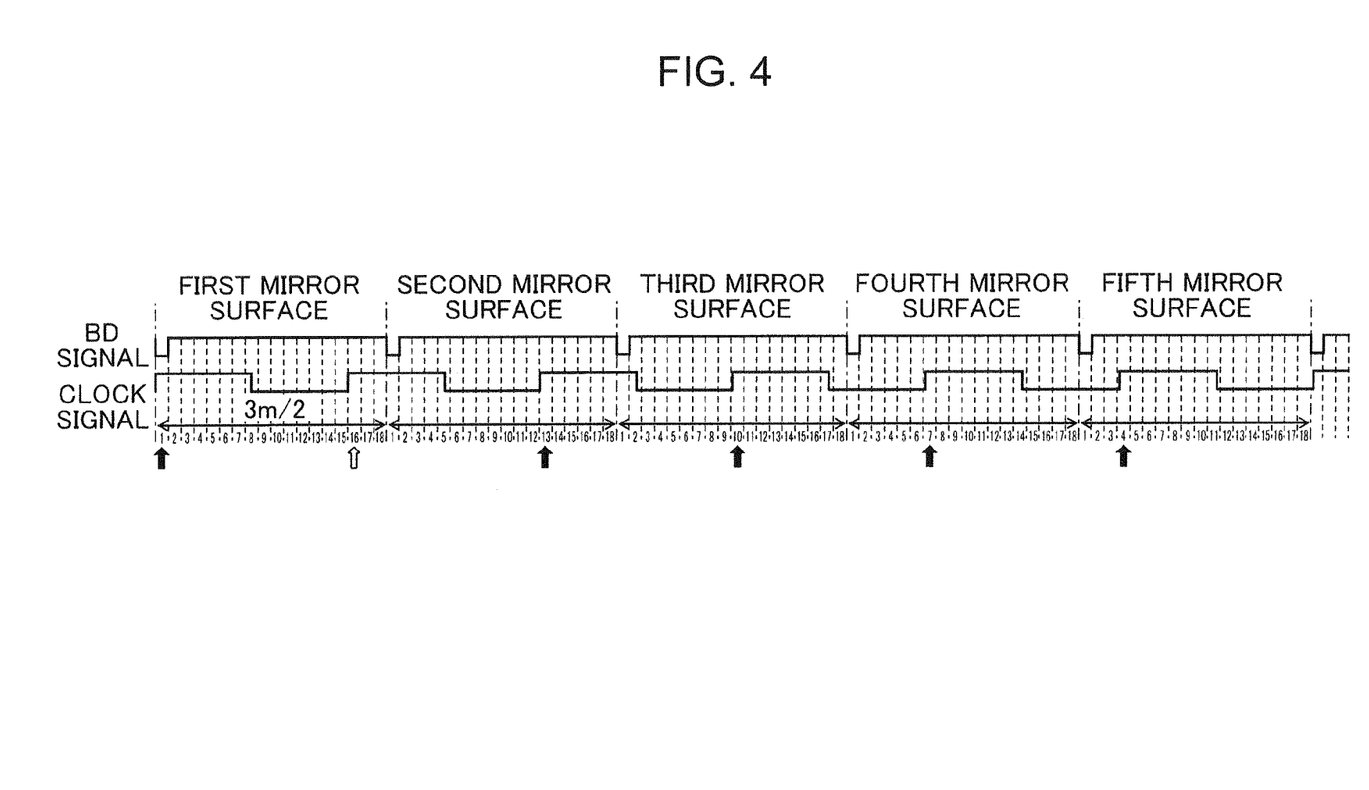
FIG. 4 is a timing chart of a beam detect (BD) signal and a clock signal.

FIG. 4 is a timing chart of the BD signal and the clock signal. As explained above, the number n of the mirror surfaces of the polygon mirror 28 and the number m of the poles of the polygon motor 32 are set coprime. Therefore, there are n patterns of generation timing of the BD signal and rising timing (edge timing) of the clock signal. The mirror-surface specifying section 304 specifies a mirror surface in use, by making use of a difference between the generation timings of the BD signal and the clock signal. The method of specifying a mirror surface is explained below in order.

FIRST EXAMPLE

1. Before Factory Shipment

The clock-generation-number storing section 307 and the mirror-surface-information storing section 309 store information necessary for specifying a mirror surface measured and set before factory shipment of the image forming apparatus 1. First, information stored in the clock-generation-number storing section 307 is explained. In the following explanation, numbers in parentheses indicate an example of processes performed before factory shipment. However, the order of the processes may vary.

(1) First, one cycle of the BD signal is divided by 3m/2 (in this embodiment, since m=12, divided by 18) and serial numbers are assigned to divided periods. Numbers 1 to 18 shown in the bottom of the timing chart in FIG. 4 indicate the serial numbers.

(2) The BD signal and the clock signal are displayed by an oscilloscope or the like. A period is detected in which rising timings (edge timings) of clock signals for one revolution of the polygon motor 32 occur among the divided periods of the BD signal. In the case of an example shown in FIG. 4, the rising timings of the clock signals for one revolution of the polygon motor 32 respectively occur in a first divided period in a first period of the BD signal (corresponding to a first mirror surface of the polygon mirror 28), in a thirteenth divided period in a second cycle (a second mirror surface), in a tenth divided period in a third cycle (a third mirror surface), in a seventh divided period in a fourth cycle (a fourth mirror surface), and in a fourth divided period in a fifth circle (a fifth mirror surface) as indicated by black arrows. The numbers are referred to as "clock generation numbers" below.

In the first cycle of the BD signal (the first mirror surface), the clock signal rises in a sixteenth divided period as well as indicated by a white arrow. However, a second rising edge of the clock signal in the same cycle of the BD signal is neglected.

(3) Subsequently, any one of the clock generation signals detected in (2) is selected as a reference clock generation number and stored in the clock-generation-number storing section 307 as a reference clock generation number corresponding to specific one surface among the five mirror surfaces (among the divided periods, a serial number of at least one period is stored as a serial number corresponding to the specific one surface among the n mirror surfaces).

(4) A designer measures flatness, optical face tangle errors, and the like of the mirror surfaces 282 of the polygon mirror 28. Shift amounts, shifting directions, and the like in the main scanning direction and the sub-scanning direction of lines formed by the light reflected on the mirror surfaces 282 are calculated on the basis of a result of the measurement. Thereafter, correction information in irradiating laser beams on the mirror surfaces 282 is stored in the mirror-surface-information storing section 309 in association with the mirror surface numbers.

2. After Apparatus Installation

After power-on, before image formation, and the like, the control section 300 specifies a mirror surface number of the mirror surface 282 on which the irradiation of the laser beam LB is received. First, the exposure control section 303 outputs a clock signal to the polygon motor 32 and causes the light source 31 to emit the laser beam LB for specifying a mirror surface.

Figure 5A:
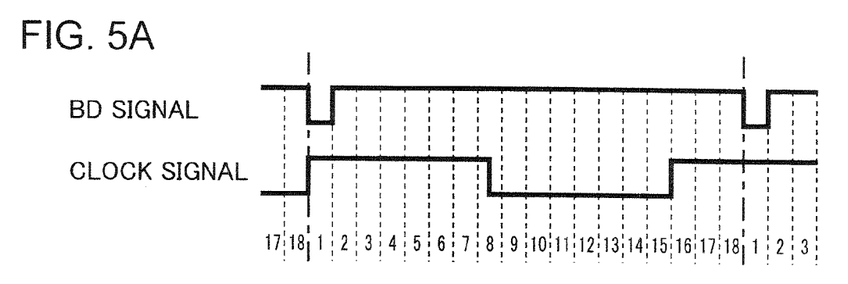
FIGS. 5A to 5C are detailed timing charts of the BD signal and the clock signal.
Figure 5B:
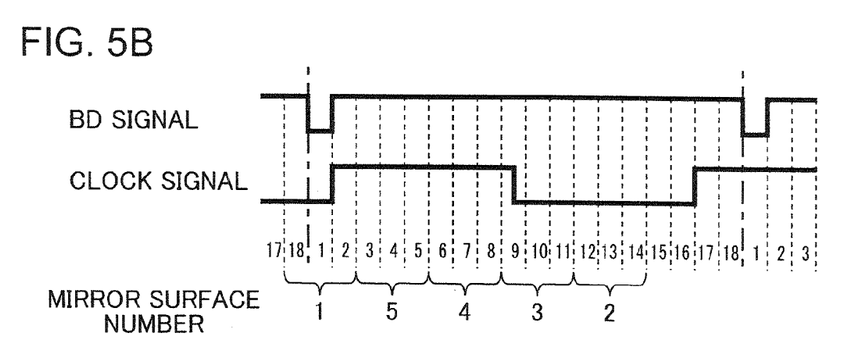
Figure 5C:
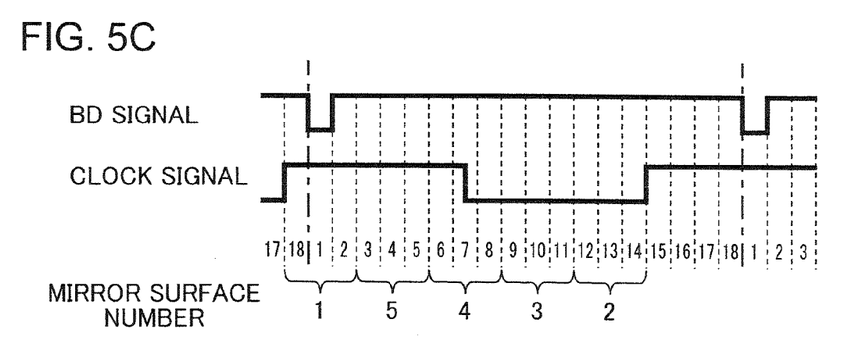

Thereafter, the mirror-surface specifying section 304 specifies a mirror surface. A method of specifying a mirror surface is explained with reference to FIGS. 5A to 5C. FIGS. 5A to 5C are timing charts of the BD signal and the clock signal after installation of the image forming apparatus 1 in a site of a user. First, FIG. 5A is explained. Generation timings of the clock signal with respect to the BD signal in FIG. 5A are the same as the generation timings in the timing chart shown in FIG. 4 (in FIG. 5A, a portions same as the first cycle portion is shown), i.e., the generation timings are the same as the generation timings before factory shipment. That is, a phase of the clock signal with respect to the BD signal is the same as the phase before factory shipment. One cycle of the BD signal is divided into eighteen and serial numbers are assigned to divided periods in the same manner as before factory shipment.

The mirror-surface specifying section 304 detects rising edges of the clock signal that occur in periods equivalent to three consecutive serial numbers including the reference clock generation number stored in the clock-generation-number storing section 307 and serial numbers before and after the reference clock generation number in the periods obtained by dividing one cycle of the BD signal into eighteen. For example, it is assumed that the clock generation number (the serial number 1) equivalent to the "first mirror surface" in FIG. 4 is selected as the "reference clock generation number". In this case, periods equivalent to the serial number 1 and numbers before and after the serial number 1, i.e., 18, 1, and 2 are treated as detection periods for rising timings of the clock signal for the "first mirror surface" (periods corresponding to at least one period). When rising timing is detected in the detection periods, the mirror-surface specifying section 304 specifies a cycle of the BD signal at that point as a period in which the first mirror surface (the specific one surface) reflects the laser beam LB.

Thereafter, the mirror-surface specifying section 304 cyclically updates, every time the BD signal is output, the mirror surface number one by one in the arrangement order of the mirror surfaces 282 on the circumferential surface of the polygon mirror 28. In the example explained above, when the BD signal is detected next after the first mirror surface is specified, the period of the BD signal is specified as a period in which the second mirror surface reflects the laser beam LB. Thereafter, every time the BD signal is detected, the cycle of the BD signal is specified as a period in which the third mirror surface, the fourth mirror surface, or the fifth mirror surface reflects the laser beam LB.

A reason for using the three consecutive serial numbers including the reference clock generation number and the serial numbers before and after the reference clock generation number for specifying a mirror surface is explained. A phase of the clock signal with respect to the BD signal changes according to a temperature change in the apparatus, a jitter of the polygon motor 32, and the like. Therefore, the phase of the clock signal with respect to the BD signal is sometimes different before factory shipment and after apparatus installation.

This is specifically explained. FIG. 5B shows generation timings of the clock signal generated when the phase of the clock single is slightly delayed with respect to the BD signal after apparatus installation compared with before factory shipment. Whereas the clock signal rises in the serial number 1 before factory shipment (see FIG. 5A), the clock signal rises in the serial number 2 after apparatus installation. Therefore, if the mirror-surface specifying section 304 sets the cycle of the BD signal depending on whether a rising edge of the clock signal is detected in the serial number 1, which is the reference clock generation number, a mirror surface cannot be correctly specified.

Therefore, to enable the mirror-surface specifying section 304 to correctly specify a mirror surface even if the phase of the clock signal with respect to the BD signal is different before factory shipment and after apparatus installation, in this embodiment, a mirror surface number is specified using periods equivalent to three consecutive serial numbers including the reference clock generation number and numbers before and after the reference clock generation number. As illustrated above, in the case of "reference clock generation number=1", when the clock signal rises in the periods equivalent to the serial number 1 and the numbers before and after the serial number 1, i.e., 18, 1, and 2, the mirror-surface specifying section 304 regards that the clock signal rises in a period indicated by the reference clock generation signal and specifies the cycle of the BD signal as the first mirror surface. Consequently, even if the clock signal rises in the serial number 2 because the phase of the clock signal is delayed as shown in FIG. 5B, the mirror specifying section 304 can specify the cycle of the BD signal as a period in which the first mirror surface reflects the laser beam LB.

FIG. 5C shows generation timings of the clock signal generated when the phase of the clock single slightly advances with respect to the BD signal after apparatus installation compared with before factory shipment. That is, whereas the clock signal rises in the serial number 1 before factory shipment, the clock signal rises in the serial number 18 after apparatus installation. In this case, likewise, if the mirror-surface specifying section 304 detects the cycle of the BD signal in which a rising edge of the clock signal occurs in the serial number 1, which is the reference clock generation number, a mirror surface cannot be specified.

However, in this embodiment, when the clock signal rises in the periods equivalent to the serial number 1, which is the reference clock generation number, and the numbers before and after the serial number 1, i.e., 18, 1, and 2, the mirror-surface specifying section 304 regards that the clock signal rises in a period indicated by the reference clock generation signal and specifies the cycle of the BD signal as the first mirror surface. Therefore, even if the clock signal rises in the serial number 2 because the phase of the clock signal advances as shown in FIG. 5C, the mirror specifying section 304 can specify the cycle of the BD signal as a period in which the first mirror surface reflects the laser beam LB.

As explained above, the mirror-surface specifying section 304 specifies a mirror surface in use and cyclically updates a mirror surface number every time the BD signal is output. The exposure control section 303 reads out correction information from the mirror-surface-information storing section 309 according to the mirror surface number updated and output by the mirror-surface specifying section 304 and outputs, to the laser-beam generating section 30, an instruction for correcting emission timing, magnification, and the like of the laser beam using the correction information. The laser-beam generating section 30 can cause the light source 31 to emit the laser beam LB corrected for each of the mirror surfaces.

In the example explained above, "reference clock generation number=1". For example, when "reference clock generation number=13" (the second mirror surface) is selected and stored in the clock-generation-number storing section 307, periods equivalent to the serial number 13, which is the reference clock generation number, and numbers before and after the serial number 13, i.e., 12, 13, and 14 are treated as detection periods of rising timing of the clock signal for specifying the "second mirror surface". When rising timing is detected in the detection periods, the mirror-surface specifying section 304 specifies the cycle of the BD signal as a period in which the second mirror surface reflects the laser beam LB. Similarly, in the case of "reference clock generation number=10", periods equivalent to the serial numbers 9, 10, and 11 are treated as detection periods for specifying "third mirror surface". In the case of "reference clock generation number=7", periods equivalent to the serial numbers 6, 7, and 8 are treated as detection periods for specifying "fourth mirror surface". In the case of "reference clock generation number=4", periods equivalent to the serial numbers 3, 4, and 5 are treated as detection periods for specifying "fifth mirror surface".

As explained above, the number n of the mirror surfaces of the polygon mirror 28 and the number m of the poles of the polygon motor 32 are set coprime. Therefore, the mirror-surface specifying section 304 can specify, by making use of a difference between generation timings of the BD signal and the clock signal, a mirror surface that reflects the laser beam. Therefore, a dedicated sensor for specifying a mirror surface is unnecessary. It is possible to reduce costs for sensors.

SECOND EXAMPLE

A method of specifying a mirror surface different from the method in the first example is explained.
1. Before Factory Shipment First, one cycle of the BD signal is divided by 3m/2 (in this embodiment, since m=12, divided by 18) and serial numbers are assigned to divided periods. Subsequently, the BD signal and the clock signal are displayed by an oscilloscope or the like. A period is detected in which rising timings of clock signals for one revolution of the polygon motor 32 occur among the divided periods of the one cycle of the BD signal (a period synchronizing with edge timing is specified). Detected serial numbers are set as clock generation numbers.

Mirror surface numbers are associated with the clock generation numbers in the order of the detection of the clock generation numbers. In the case of FIG. 4, since the clock generation numbers are detected in the order of 1, 13, 10, 7, and 4, a first mirror surface is associated with the clock generation number 1, a second mirror surface is associated with the clock generation number 13, a third mirror surface is associated with the clock generation number 10, a fourth mirror surface is associated with the clock generation number 7, and a fifth mirror surface is associated with the clock generation number 4.

Figure 6:
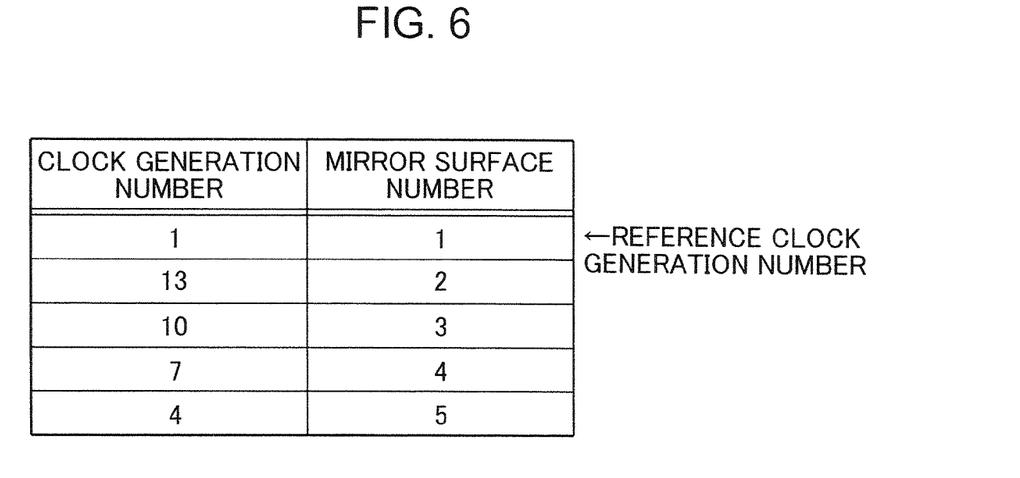
FIG. 6 is a diagram showing data structure of a clock-generation-number storing section.

A result of the association of the clock generation numbers and the mirror surface numbers is stored in the clock-generation-number storing section 307 (a serial number of at least one period among the divided periods is stored as a serial number corresponding to specific one surface among the n mirror surfaces). FIG. 6 is a diagram showing data structure of the clock-generation-number storing section 307. The clock generation number associated with the first mirror surface is set as a reference clock generation number.

The association of the clock generation numbers and the mirror surface numbers may be association other than the association explained above as long as the mirror surface numbers are cyclically assigned in the order of the detection of the clock generation numbers to correspond to the order of the arrangement of the mirror surfaces 282 on the circumferential surface of the polygon mirror 28. For example, the fourth mirror surface may be associated with the clock generation number 1, the fifth mirror surface may be associated with the clock generation number 13, the first mirror surface may be associated with the clock generation number 10, the second mirror surface may be associated with the clock generation number 7, and the third mirror surface may be associated with the clock generation number 4.
2. After Apparatus Installation First, the exposure control section 303 outputs a clock signal to the polygon motor 32 and causes the light source 31 to emit the laser beam LB for specifying a mirror surface.

The mirror-surface specifying section 304 detects a period in which first rising timing of the clock signal of the polygon motor 32 occurs among the periods obtained by dividing one cycle of the BD signal into eighteen. Subsequently, the mirror-surface specifying section 304 compares three consecutive serial numbers including a serial number of the detected period and serial numbers before and after the serial number and the clock generation numbers stored in the clock-generation-number storing section 307 (a search operation). The mirror-surface specifying section 304 reads out a mirror surface number stored in association with the clock generation number coinciding with any one of the three consecutive serial numbers and specifies, as a period in which a mirror surface (specific one surface) of the read-out mirror surface number reflects the laser beam LB, a cycle of the BD signal in which the clock signal rises first. Thereafter, the mirror-surface specifying section 304 cyclically updates, every time the BD signal is output, the mirror surface numbers one by one in the order of the arrangement of the mirror surfaces 282 on the circumferential surface of the polygon mirror 28.

In the first and second examples, the rising edge of the clock signal is explained as the edge timing. However, a falling edge of the clock signal may be used as the edge timing.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A light scanning device comprising:
a light source which emits a laser beam;
an optical unit including:
   a polygon mirror including n (n is an integer equal to or larger than 1) mirror surfaces and which guides the laser beam in a main scanning direction of an image bearing member; and
   a polygon motor including m (m is an integer equal to or larger than 1 and is coprime with n) poles and which rotates the polygon mirror;
a signal output section which outputs a clock signal;
a light receiving section arranged on a start end side in the main scanning direction on a scanning path of the laser beam reflected by the polygon mirror, and which receives the laser beam and outputs a light reception signal;
a clock-generation-number storing section which assigns serial numbers to periods obtained by dividing, by a number 3m/2, one cycle of the light reception signal periodically obtained by supplying the clock signal to the polygon motor to rotate the polygon mirror and stores, as a serial number corresponding to specific one surface among the n mirror surfaces, the serial number of at least one period among the divided periods synchronizing with edge timings of one of rising edges and falling edges of the clock signals in number required for rotating the polygon mirror once; and
a specifying section which treats, as periods corresponding to the at least one period, periods equivalent to three consecutive serial numbers including the serial number of the at least one period and the serial numbers before and after the serial number, to specify, as a period in which the specific one surface among the mirror surfaces is used, a cycle of the light reception signal at the time when the edge timings are detected in the periods.

2. The light scanning device according to claim 1, wherein the clock-generation-number storing section stores in advance, as a reference clock generation number corresponding to a first surface among the mirror surfaces, a serial number of any one period among the divided periods synchronizing with the edge timings, and
the specifying section specifies, as a period in which the first surface is used, a cycle of the light reception signal at the time when the edge timings are detected in the periods equivalent to three consecutive serial numbers including the reference clock generation number and the serial numbers before and after the reference clock generation number.

3. The light scanning device according to claim 2, further comprising:
a mirror-surface-information storing section which stores surface information on the mirror surfaces in association with the mirror surface numbers 1 to n; and
an exposure control section which controls emission timing of the laser beam on the basis of the mirror surface information, wherein
the specifying section sequentially switches the mirror surface numbers every time the light reception signal is output after specifying the mirror surface number, and
the exposure control section reads out, from the mirror-surface-information storing section, the mirror surface information stored in association with the mirror surface number specified by the specifying section, and causes the light source to emit the laser beam.

4. The light scanning device according to claim 1, wherein the clock-generation-number storing section stores in advance serial numbers of the divided periods synchronizing with the edge timings and mirror surface numbers 1 to n assigned in order of occurrence of the edge timings in association with the serial numbers, and
the specifying section retrieves, from the clock-generation-number storing section, the clock generation number coinciding with any one of three consecutive serial numbers including the serial number synchronizing with the first edge timing of the clock signal and the serial numbers before and after that serial number, and specifies, as a period in which the mirror surface of the mirror surface number stored in association with the retrieved clock generation number is used, a cycle of the light reception signal at the time when the edge timing of the clock signal is detected first.

5. The light scanning device according to claim 4, further comprising:
a mirror-surface-information storing section which stores surface information on the mirror surfaces in association with the mirror surface numbers 1 to n; and
an exposure control section which controls emission timing of the laser beam on the basis of the mirror surface information, wherein
the specifying section sequentially switches the mirror surface numbers every time the light reception signal is output after specifying the mirror surface number, and
the exposure control section reads out, from the mirror-surface-information storing section, the mirror surface information stored in association with the mirror surface number specified by the specifying section, and causes the light source to emit the laser beam.

6. An image forming apparatus comprising:
an image bearing member;
the light scanning device according to claim 1 configured to irradiate a laser beam based on image data on the image bearing member to form an electrostatic latent image; and
an image forming section which supplies a developer to the image bearing member to visualize the electrostatic latent image to thereby form an image.

* * * * *